(12) United States Patent
Endres

(10) Patent No.: US 7,092,809 B2
(45) Date of Patent: Aug. 15, 2006

(54) METHOD AND SYSTEM FOR CONTROLLING BRAKING EQUIPMENT

(75) Inventor: Franz-Josef Endres, Sessenhausen (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 10/850,235

(22) Filed: May 20, 2004

(65) Prior Publication Data

US 2004/0212247 A1 Oct. 28, 2004

Related U.S. Application Data

(63) Continuation of application No. PCT/EP02/12922, filed on Nov. 18, 2002.

(30) Foreign Application Priority Data

Nov. 20, 2001 (DE) ................... 101 56 815

(51) Int. Cl.
  *B60T 7/12* (2006.01)
  *G06F 7/00* (2006.01)
(52) U.S. Cl. ................... 701/70; 701/78; 192/218
(58) Field of Classification Search ............ 180/18 A, 180/179, 72.1, 282, 290; 701/70, 76, 81, 701/78; 303/3, 20, 112, 191, 192, 24.1, 122; 192/218; B60T 25/08, 8/00, 17/16
See application file for complete search history.

(56) References Cited

U.S. PATENT DOCUMENTS

| | | | | |
|---|---|---|---|---|
| 4,382,604 A | * | 5/1983 | Nakagawa | ............... 280/6.153 |
| 4,717,207 A | * | 1/1988 | Kubota et al. | ................. 303/3 |
| 4,771,387 A | * | 9/1988 | Hexel et al. | .................. 701/76 |
| 4,805,105 A | * | 2/1989 | Weiss et al. | .................. 701/78 |
| 5,706,909 A | * | 1/1998 | Bevins et al. | ............... 180/273 |
| 5,779,328 A | * | 7/1998 | Mergenthaler et al. | 303/122.12 |
| 5,916,062 A | * | 6/1999 | Siepker | ...................... 477/194 |
| 6,019,436 A | * | 2/2000 | Siepker | ...................... 303/13 |
| 6,086,515 A | * | 7/2000 | Buschmann et al. | ........ 477/194 |

(Continued)

FOREIGN PATENT DOCUMENTS

DE 24 20 252 10/1975

(Continued)

OTHER PUBLICATIONS

Wolff C. et al., Testing of brake load sensing devices in in-service cars and light trucks with hydraulic brake systems, Apr. 01, 1984, (rom Dialog(R) File 81, acc. No. 54052).*

(Continued)

*Primary Examiner*—Cuong Nguyen
(74) *Attorney, Agent, or Firm*—MacMillan, Sobanski & Todd LLC

(57) ABSTRACT

The present invention provides a method and a system for controlling braking equipment with a function for the driveaway assistance of a motor vehicle. After setting an initial operating state of the braking equipment in which the function for the driveaway assistance is selectively switched on or off, an operating state of the motor vehicle in which the motor vehicle is stationary or nearly stationary is determined. If the motor vehicle is stationary and a characteristic control parameter capable of being influenced by the driver is detected, the braking equipment of the motor vehicle is controlled in such a way that, by switching on or off the function for the driveaway assistance of the motor vehicle, an operating state of the braking equipment differing from the initial operating state is produced.

11 Claims, 2 Drawing Sheets

U.S. PATENT DOCUMENTS

| | | | |
|---|---|---|---|
| 6,260,934 B1* | 7/2001 | Lee | 303/192 |
| 6,269,295 B1* | 7/2001 | Gaugush et al. | 701/55 |
| 6,286,617 B1* | 9/2001 | DeLuca et al. | 180/275 |
| 6,401,015 B1* | 6/2002 | Stewart et al. | 701/19 |
| 6,401,899 B1* | 6/2002 | Kanehisa et al. | 192/219.5 |
| 6,439,675 B1* | 8/2002 | Zechmann et al. | 303/191 |
| 6,502,908 B1* | 1/2003 | Mueller et al. | 303/191 |
| 6,530,450 B1* | 3/2003 | DeLuca et al. | 180/275 |
| 6,543,567 B1* | 4/2003 | DeLuca et al. | 180/275 |
| 6,554,744 B1* | 4/2003 | Schmidt | 477/208 |
| 6,629,024 B1* | 9/2003 | Tabata et al. | 701/22 |
| 6,679,810 B1* | 1/2004 | Boll et al. | 477/195 |
| 6,739,676 B1* | 5/2004 | Isono et al. | 303/114.3 |
| 6,748,310 B1* | 6/2004 | Tamasho et al. | 701/70 |
| 2003/0214186 A1 | 11/2003 | Kinder et al. | |

FOREIGN PATENT DOCUMENTS

| | | |
|---|---|---|
| DE | 36 18 532 | 12/1986 |
| DE | 44 21 088 | 10/1994 |
| DE | 195 25 552 | 1/1997 |
| DE | 196 30 870 | 2/1998 |
| DE | 198 25 642 | 12/1999 |
| DE | 199 01 581 | 5/2000 |
| DE | 198 49 799 | 6/2000 |
| DE | 199 31 345 | 12/2000 |
| DE | 199 50 034 | 4/2001 |
| DE | 199 62 556 | 7/2001 |
| DE | 100 63 061 | 6/2002 |
| EP | 1048538 B1 * | 10/2004 |
| GB | 2192681 A * | 1/1998 |

OTHER PUBLICATIONS

Unknown author, The new Fiat Palio, Fiat Palio weekend and Fiat Siena, Sep. 23, 2000 from Dialog(R) File 81, acc. no. 155290.*

Scheibe et al., Safety monitoring of air brake systems on board commercial vehicles, Transportation Research Record, n 1560, Nov. 1986, p. 40-47, published in 1996 (from Dialog(R) File 8, acc. no. 04659406).*

Taheri et al., Slip control braking of an automobile during combined braking and steering maneuvers, Winter Annual Meeting of the American Society of Mechanical Engineers, Dec. 1, 1991 (from Dialog(R) File 8, acc. no. 03417090).*

Shilton, Braking system load sensing valves, Inst Mech Eng, Proc 1969-70 v 184, Auxiliary Power Services and Equipment for Road Vehicles, Sym., pap 12 pp. 30-7, published in 1969 (from Dialig(R) File 8, acc. no. 00188770).*

Document Bibliography and Abstract for DE 36 18 532 from the European Patent Office website; http://v3.espacenet.com/textdoc?DB=EPODOC&IDX=DE3619532, printed May 17, 2004.

Document Bibliography and Abstract for DE 100 63 061 from the European Patent Office website; http://v3.espacenet.com/textdoc?DB=EPODOC&IDX=DE10063061, printed May 17, 2004.

Document Bibliography and Abstract for DE 195 25 552 from the European Patent Office website; http://v3.espacenet.com/textdoc?DB=EPODOC&IDX=DE19525552, printed May 17, 2004.

Document Bibliography and Abstract for DE 196 30 870 from the European Patent Office website; http://v3.espacenet.com/textdoc?DB=EPODOC&IDX=DE19630870, printed May 17, 2004.

Document Bibliography and Abstract for DE 199 50 034 from the European Patent Office website; http://v3.espacenet.com/textdoc?DB=EPODOC&IDX=DE19950034, printed May 17, 2004.

* cited by examiner

METHOD AND SYSTEM FOR CONTROLLING BRAKING EQUIPMENT

CROSS REFERENCE TO RELATED APPLICATIONS

This application is a continuation of International Application No. PCT/EP02/12922 filed Nov. 18, 2002, the disclosures of which are incorporated herein by reference, and which claimed priority to German Patent Application No. 101 56 815.0 filed Nov. 20, 2001, the disclosures of which are incorporated herein by reference.

The present invention relates to a method and a system for controlling braking equipment with a function for the driveaway assistance of a motor vehicle. In particular, the present invention relates to a method and a system in which operating states of the vehicle and also a control parameter are detected, in order to control the braking equipment of the motor vehicle in such a way that the function for the driveaway assistance is switched on or off.

BACKGROUND OF THE INVENTION

Normally, the braking equipment of a motor vehicle or parts of the braking equipment is or are also operated when the motor vehicle is stationary in order to keep the latter stationary. For this, use is generally made of a parking brake device, which is typically actuated by a vehicle driver, or of braking equipment which produces in a controlled manner braking forces required to keep the vehicle stationary.

To drive away the motor vehicle, it is necessary to reduce the braking forces produced when the vehicle is stationary.

In the case of conventional braking equipment to be operated by a vehicle driver, it is necessary for the vehicle driver, in addition to the measures required for driving away, also to take measures to release the brake (parking brake).

In order to assist a vehicle driver when driving away a motor vehicle, it is known from German Laid-Open Application 24 20 252 to deactivate the parking brake of a motor vehicle in dependence on a position of an accelerator pedal. In this case, the parking brake, which produces a fixedly preset braking force when the vehicle is stationary, is deactivated in order to reduce the fixedly preset braking force as soon as the accelerator pedal is actuated.

Driveaway assistance for a motor vehicle on an ascending slope is known from DE 36 18 532 A1, and corresponding U.S. Pat. No. 4,717,207, both of which are incorporated by reference herein. In this case, a braking system has a valve which is arranged between the master cylinder and the wheel-brake cylinders and which is closed when the vehicle is stationary in order to maintain a brake actuation pressure and opened in order to release the brake actuation pressure and allow the vehicle to be driven away. When the motor vehicle is to be brought from stationary to a driving state, it is checked whether the engine torque preset by a vehicle driver corresponds to a driveaway torque required for driving away. In this case, the required driveaway torque is determined in dependence on a current angle of inclination of the vehicle on an ascending slope and the vehicle weight.

Alternatively, provision is made in the case of this driveaway assistance to detect torques acting on driven wheels of the motor vehicle. If torques acting on the driven wheels are large enough to overcome the braking torques produced by the wheel-brake cylinders and the rolling-back torque brought about by an ascending slope, the valve is opened to release the brake actuation pressure produced when the vehicle is stationary.

A fundamental problem of these known systems is that the function for the driveaway assistance is always activated although it is not desired in all driving situations. For example, when driving away on an ascending or descending slope with a trailer attached or when parking on an ascending or descending slope, undesired driving states may arise owing to the automatic reduction of the braking pressure.

SUMMARY OF THE INVENTION

The present invention provides a method and a system for controlling braking equipment with a function for the driveaway assistance of a motor vehicle which enable situation-dependent activation or deactivation of the driveaway assistance by the vehicle driver. In the case of the method according to the invention, an initial operating state of the braking equipment in which the driveaway assistance is selectively either switched on or off is set. Such a setting of the initial operating state can be effected, for example, by means of a switch to be actuated by the driver or by speech input. Furthermore, an operating state of the motor vehicle in which the motor vehicle is stationary or nearly stationary is detected. This state (stationary or approximately walking speed) of the motor vehicle can be determined, for example, by detecting vehicle movements and comparing them with vehicle movements which can occur when the motor vehicle is in a driving state. If such movements typical of the vehicle being driven are absent, it is assumed that the vehicle is stationary or nearly stationary. If the vehicle is in this state and in addition a characteristic control parameter capable of being influenced by the vehicle driver is detected, braking equipment is controlled in reaction to the detection of the control parameter, in order, by switching on or off the function for the driveaway assistance, to produce an operating state of the braking equipment differing from the initial operating state. If, accordingly, the driveaway assistance was switched off in the initial operating state of the braking equipment, it is switched on in reaction to the detection of the control parameter. If, in contrast, it was switched on, it is switched off in reaction to the detection of the control parameter. The method according to the invention enables a driver to be able to change, in a situation-dependent and flexible manner, as required, between an operating state of the braking equipment with switched-on driveaway assistance and an operating state of the braking equipment with switched-off driveaway assistance.

The characteristic control parameter is preferably a brake-pressure curve which is initiated by the vehicle driver. The driver can thus switch off or on the driveaway assistance in a simple manner, for example by briefly re-pressing the brake pedal.

The brake-pressure curve serving as the control parameter can be determined by means of a brake-pressure sensor. Such brake-pressure sensors are already present in vehicles equipped with electronic chassis control systems, such as, for example, an electronic stability programme (ESP) or an electrohydraulic brake (EHB), so that there is no need to install additional sensors.

The braking equipment can be controlled in such a way that, after producing an operating state differing from the initial operating state by switching on or off the function for the driveaway assistance of the motor vehicle and after detection of a driveaway procedure, the initial operating state of the braking equipment is restored. The driver can thus set the initial operating state which he prefers and activate or deactivate the driveaway assistance once, as required, in a particular driving situation. Subsequently, the system automatically returns to its set initial operating state again.

Preferably, a current operating state of the braking equipment in which the function for the driveaway assistance of the motor vehicle is switched on or off is indicated to the driver, for example by means of an acoustic or visual signal. The current operating state can be indicated permanently by means of a visual indication and/or once by means of an acoustic or visual signal when a change between the operating states of the braking equipment has taken place by switching on or off the driveaway assistance.

In addition, the braking equipment can be controlled in reaction to the detection of the control parameter in such a way that a function of the braking equipment is activated by means of which, independently of the braking equipment being actuated by the driver, braking forces are built up which keep the motor vehicle stationary. In this way, the driver can simultaneously activate an electronic parking brake (EPB) and switch on or off the driveaway assistance. This is particularly convenient for the driver, for example when stopping and subsequently driving away on an ascending slope, since he can, for example by re-pressing the brake pedal, simultaneously activate the electronic parking brake to keep the vehicle stationary and the driveaway assistance to reduce the braking force during the subsequent driveaway procedure.

Furthermore, the invention provides a system for controlling braking equipment with a function for the driveaway assistance of a motor vehicle. The system according to the invention comprises a control device and also detecting devices (sensors) for detecting parameters characterising operating states of the motor vehicle and also a control parameter capable of being influenced by the driver, the control device being operated in accordance with one of the above-mentioned methods.

Other advantages of this invention will become apparent to those skilled in the art from the following detailed description of the preferred embodiment, when read in light of the accompanying drawings.

DETAILED DESCRIPTION OF THE INVENTION

Figure 1:
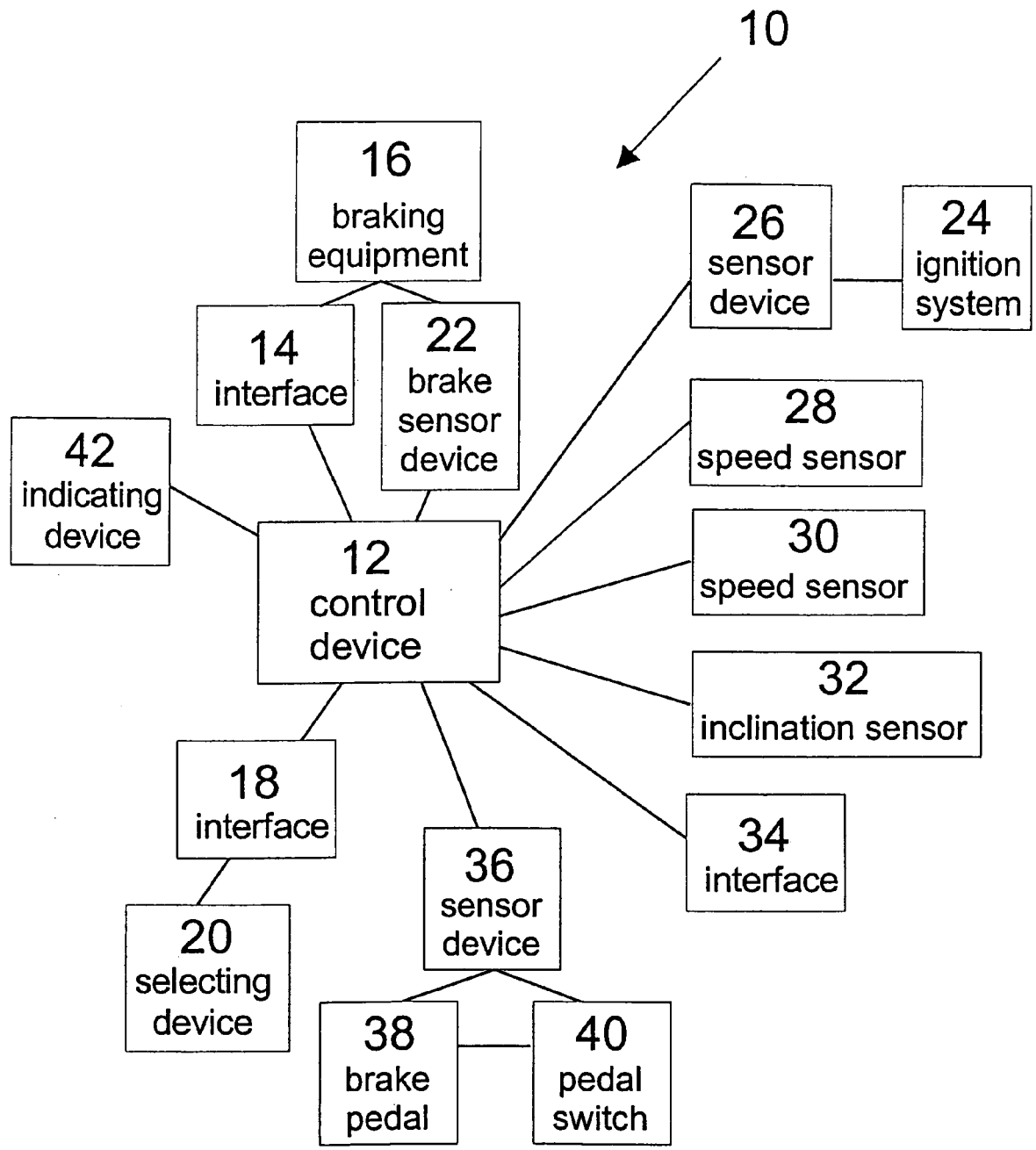
FIG. 1 shows a schematic representation of a system according to the invention for controlling braking equipment with a function for the driveaway assistance of a motor vehicle.

A system 10, represented in FIG. 1, for controlling braking equipment with a function for the driveaway assistance of a motor vehicle may be a separately designed device of a motor vehicle, may use, at least partly, already existing components of further systems of the motor vehicle, or may be included in a system which provides further control and monitoring functions for the motor vehicle.

The system for controlling braking equipment with a function for the driveaway assistance of a motor vehicle 10 has a control device 12, which controls braking equipment 16 of a motor vehicle via an interface 14. A selecting device 20 is connected to the control device 12 via an interface 18, and a vehicle driver can use this selecting device to set a desired initial operating state of the braking equipment 16. The braking equipment 16 is controlled by the control device 12 in dependence on the selected initial operating state in such a way that a driveaway assistance function of the braking equipment 16 is selectively either switched on or off. The current operating state of the braking equipment 16 is detected by the control device 12 with the aid of a brake sensor device 22.

Furthermore, the control device 12 for controlling the braking equipment 16 uses several devices, described hereinbelow, to detect the current operating state of the motor vehicle and also a control parameter capable of being influenced by the vehicle driver and from the data provided by these devices determines whether the braking equipment 16 is to be brought into an operating state differing from the initial operating state by switching on or off the function for the driveaway assistance of the motor vehicle.

To detect an operating state of an ignition system 24 of the motor vehicle, a sensor device 26 connected to the control device 12 and the ignition system 24 is present.

Furthermore, the control device 12 is connected to a speed sensor 28 for detecting the current vehicle speed, a wheel rotational speed sensor 30 for detecting rotational speeds of individual or a plurality of wheels, and a vehicle inclination sensor 32 for detecting the current inclination of the motor vehicle in its longitudinal direction.

Via an interface 34, the control device 12 receives data provided by further components (not shown) of the motor vehicle and supplying further information about the state of the vehicle in addition to the above-mentioned operating variables, for example information which characterises fault-free and/or faulty operating states of a vehicle engine management system, an antilock braking system (ABS) and systems for traction and stability control (e.g. ESP, ASR, ASD), and information which indicates the tyre inflation pressure of individual or a plurality of tyres and available amounts of operating agents (e.g. gear oil, engine oil).

A further sensor device 36 is connected to a brake pedal 38 and, if present, to a brake pedal switch 40, in order to determine positions and/or movements of the brake pedal 38 and its actuation.

In order to indicate the current operating state of the braking equipment 16 to the vehicle driver, an indicating device 42 controlled by the control device 12 is present. The indicating device 42 is designed in such a way that it delivers a permanent visual signal to indicate the current operating state of the braking equipment 16 and in addition indicates a change between different operating states of the braking equipment 16 to the vehicle driver by a single visual or acoustic signal.

Figure 2:
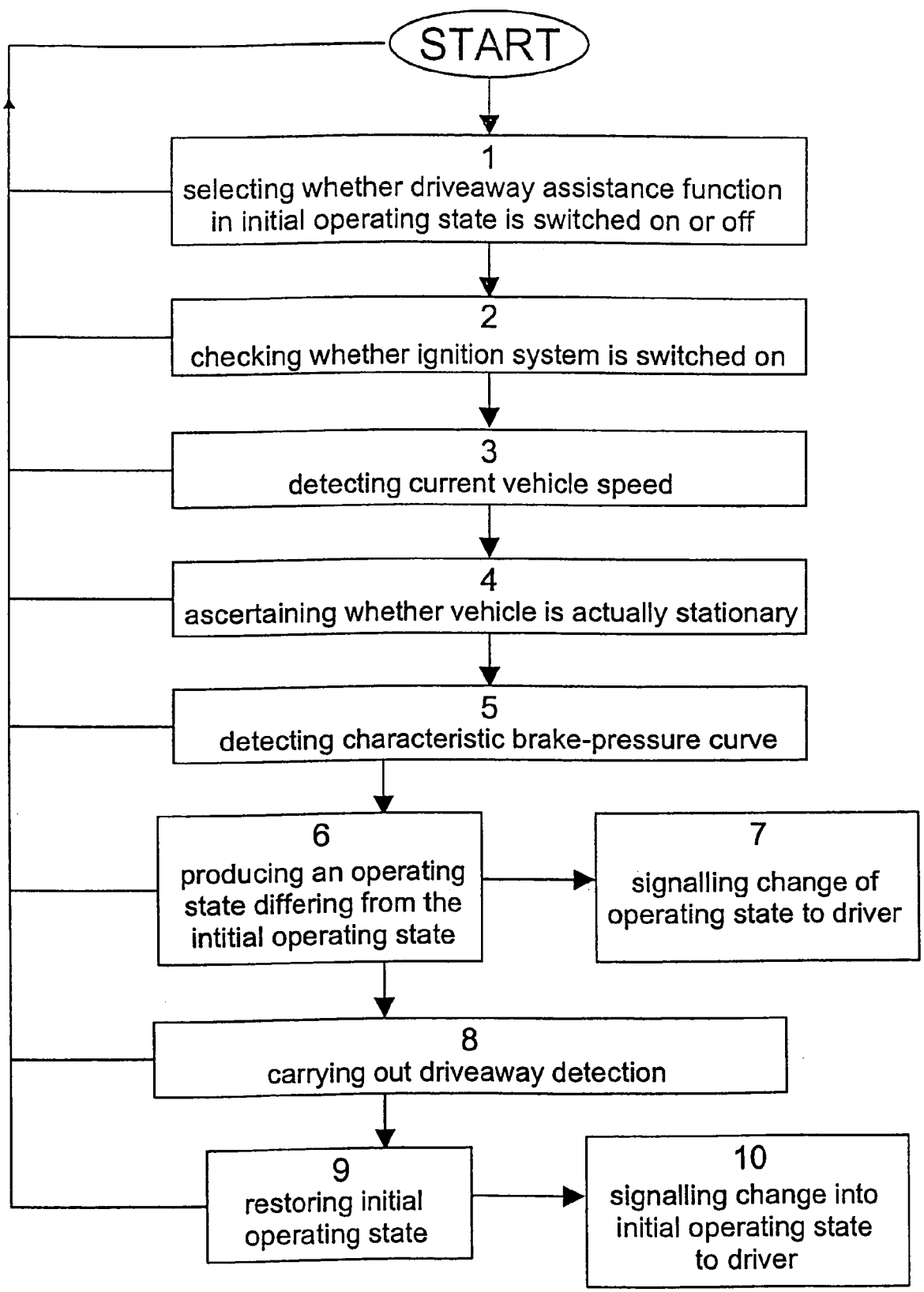
FIG. 2 shows a flow chart of an embodiment of a method according to the invention for controlling braking equipment with a function for the driveaway assistance of a motor vehicle.

With reference to the flow chart represented in FIG. 2, the operation of the system 10 for controlling braking equipment 16 with a function for the driveaway assistance of a motor vehicle is described hereinbelow.

In order to control the braking equipment 16 of the motor vehicle in such a way that situation-dependent switching-on or -off of the driveaway assistance function by the vehicle driver is possible, it is necessary first of all to set an initial operating state of the braking equipment 16 in which the driveaway assistance function is selectively either switched on or off. For this, in step 1 the driver selects via the selecting device 20 shown in FIG. 1 whether the driveaway assistance function of the braking equipment 16 is to be switched on or off in the initial operating state.

Subsequently, it is to be determined whether the motor vehicle is stationary or nearly stationary. For this, in step 2 it is checked whether the ignition system 24 is switched on. A switched-on state of the ignition 24 is understood in this context to mean not only the operating state of the motor vehicle in which its engine is running, but also operating states in which the starting of the engine is possible. The last-mentioned case relates to motor vehicles in which the engine is automatically switched off when the vehicle is stationary and/or in driving mode when no engine power is required (e.g. when allowing the vehicle to coast). A switched-on state of the ignition 24 exists in this case when the engine can be started again, for example by actuation of an accelerator pedal.

In step 3, the current vehicle speed is detected by means of the speed sensor 28 in order to ascertain whether the vehicle is moving (at more than walking speed) or is stationary. If the detected vehicle speed is approximately zero, it is ascertained in step 4 by means of the inclination sensor 32 whether the vehicle is actually stationary.

In general, a motor vehicle in driving mode displays dynamic movements characteristic of this. Accordingly, it can be determined whether or not a motor vehicle is stationary or nearly stationary if movements of the motor vehicle do not correspond to the movements typical of the driving mode.

Current inclinations of the motor vehicle, to be more precise changes of inclination about its transverse axis ("pitching movements"), are detected by the inclination sensor 32. If the detected vehicle movements lie in a range in which vehicle movements typical of it being driven can lie, it is assumed that the motor vehicle is not stationary. In contrast, it can be ascertained that the motor vehicle is stationary or nearly stationary if the detected vehicle movements do not lie in the range of movements typical of it being driven.

If the absence of vehicle movements typical of it being driven is determined in step 4, a characteristic brake-pressure curve is detected by means of the sensor device 36 in step 5. The characteristic brake-pressure curve is initiated by the driver briefly re-pressing the brake pedal 38.

If it is ascertained in step 2 that the ignition system 24 is not switched on, and in steps 3 and/or 4 that the vehicle is not stationary or nearly stationary, or the characteristic control parameter is not detected in step 5, the method for controlling the system 10 is ended after the respective steps.

However, if the stated conditions are met, the control device 12 controls the braking equipment 16 in step 6 such that, by switching on or off the driveaway assistance function, an operating state of the braking equipment 16 differing from the initial operating state is produced. If it was specified in step 1 that the driveaway assistance function is switched off in the initial operating state of the braking equipment 16, this function is switched on in step 6, and it is was specified in step 1 that the driveaway assistance function is switched on in the initial operating state of the braking equipment 16, it is switched off in step 6.

In step 6, the braking equipment 16 can also be controlled in such a way that, in addition to or as an alternative to the driveaway assistance function being switched on, a function of the braking equipment 16 is activated by means of which, independently of the braking equipment 16 being actuated by the driver, a brake pressure is built up which is suitable for keeping the motor vehicle stationary. The setting of the brake pressure to be built up by the braking equipment 16 can be performed in various ways. The braking equipment 16 can be controlled in such a way that, upon each such activation, it produces a preset brake pressure or a brake pressure which is set in dependence on the inclination of the motor vehicle detected by the inclination sensor 32 when the vehicle is stationary or nearly stationary. As a recommended value, there may also be used a clamping force which is produced by a parking brake device and, for example in dependence on the type of vehicle in which the system 10 is used, should amount to more than two thirds of the maximum possible clamping force.

In step 7, the change of the operating state of the braking equipment 16 is signalled to the vehicle driver by means of the indicating device 42.

After the change of the operating state of the braking equipment 16, driveaway detection is carried out in step 8. For this, the rotational speed of individual or a plurality of wheels is determined by means of the wheel rotational speed sensor 30. If a driveaway procedure of the motor vehicle is detected on the basis of the wheel movements, for example upon reaching a predetermined wheel rotational speed, the braking equipment 16 is controlled by the control device 12 in step 9 in such a way that, by switching on or off the function for the driveaway assistance of the motor vehicle and/or the function of the braking equipment 16 by means of which, independently of the braking equipment 16 being actuated by the driver, a brake pressure is built up which is suitable for keeping the motor vehicle stationary, the initial operating state of the braking equipment 16 is restored. The change of the operating state of the braking equipment 16 in step 6 accordingly activates or deactivates the relevant functions of the braking equipment 16 only for a driveaway procedure.

The change of the operating state of the braking equipment 16 into the initial operating state is signalled to the vehicle driver in step 10, again by means of the indicating device 42.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. Method for controlling braking equipment with a function for the driveaway assistance of a motor vehicle having the following steps:
    selecting an initial operating state of the braking equipment in which a function for the driveaway assistance of the motor vehicle is selectively switched on or off,
    detecting a characteristic control parameter capable of being influenced by a vehicle driver,
    subsequently controlling the braking equipment in reaction to the detection of the control parameter, in order, by switching on or off the function for the driveaway assistance of the motor vehicle, to produce an operating state of the braking equipment differing from the initial operating state, wherein
    if the selection was that the function for the driveaway assistance of the motor vehicle is switched off in the initial operating state of the braking equipment, this function is switched on, and
    if the selection was that the function for the driveaway assistance of the motor vehicle is switched on in the initial operating state of the braking equipment, this function is switched off, and wherein subsequently a production of the operating state of the braking equipment differing from the initial operating state takes place only in reaction to the detection of an operating state of the motor vehicle in which the motor vehicle is stationary or nearly stationary.

2. Method according to claim 1, wherein the characteristic control parameter is a characteristic brake-pressure which is initiated by the vehicle driver.

3. Method according to claim 2, wherein the brake-pressure is detected by means of a brake-pressure sensor.

4. Method according to claim 1, further including the step:
controlling the braking equipment in order, after producing the operating state of the braking equipment differing from the initial operating state by switching on or off the function for the driveaway assistance of the motor vehicle and after detection of a driveaway procedure, to restore the initial operating state of the braking equipment.

5. Method according to claim 1, further including the step:
indicating a current operating state of the braking equipment in which the function for the driveaway assistance of the motor vehicle is switched on or off.

6. Method according to claim 5, wherein the current operating state of the braking equipment is indicated by means of an acoustic or visual signal.

7. Method according to claim 1, further including the step:
controlling the braking equipment in reaction to the detection of the control parameter such that a function of the braking equipment is activated by means of which, independently of the braking equipment being actuated by the vehicle driver, braking forces are built up which keep the motor vehicle stationary.

8. System for controlling braking equipment with a function for the driveaway assistance of a motor vehicle having:
a control device and
detecting devices for detecting parameters characterising operating states of the motor vehicle and also a control parameter capable of being influenced by a vehicle driver, the control device being structured and configured to carry out the following steps:
selecting an initial operating state of the braking equipment in which the function for the driveaway assistance of the motor vehicle is selectively switched on or off,
detecting a characteristic control parameter capable of being influenced by a vehicle driver,
subsequently controlling the braking equipment in reaction to the detection of the control parameter, in order, by switching on or off the function for the driveaway assistance of the motor vehicle, to produce an operating state of the braking equipment differing from the initial operating state, wherein
if the selection was that the function for the driveaway assistance of the motor vehicle is switched off in the initial operating state of the braking equipment, this function is switched on, and
if the selection was that the function for the driveaway assistance of the motor vehicle is switched on in the initial operating state of the braking equipment, this function is switched off, and wherein subsequently
a production of the operating state of the braking equipment differing from the initial operating state takes place only in reaction to the detection of an operating state of the motor vehicle in which the motor vehicle is stationary or nearly stationary.

9. System according to claim 8, wherein the detecting device for detecting the control parameter capable of being influenced by a vehicle driver is a brake-pressure sensor.

10. System according to claim 8, further including an indicating device for indicating a current operating state of the braking equipment.

11. System according to claim 9, further including an indicating device for indicating a current operating state of the braking equipment.

* * * * *